(12) United States Patent
Ronciak

(10) Patent No.: US 7,643,502 B2
(45) Date of Patent: Jan. 5, 2010

(54) METHOD AND APPARATUS TO PERFORM FRAME COALESCING

(75) Inventor: John A. Ronciak, Beaverton, OR (US)

(73) Assignee: Intel Corporation, Santa Clara, CA (US)

( * ) Notice: Subject to any disclaimer, the term of this patent is extended or adjusted under 35 U.S.C. 154(b) by 1451 days.

(21) Appl. No.: 10/326,238

(22) Filed: Dec. 19, 2002

(65) Prior Publication Data

US 2004/0120339 A1  Jun. 24, 2004

(51) Int. Cl.
*H04L 12/28* (2006.01)

(52) U.S. Cl. .............. 370/412; 370/392; 370/429; 711/100; 710/52

(58) Field of Classification Search .............. None
See application file for complete search history.

(56) References Cited

U.S. PATENT DOCUMENTS

| | | | | |
|---|---|---|---|---|
| 5,299,313 A | * | 3/1994 | Petersen et al. | 709/234 |
| 5,953,335 A | * | 9/1999 | Erimli et al. | 370/390 |
| 5,974,518 A | * | 10/1999 | Nogradi | 711/173 |
| 6,006,275 A | * | 12/1999 | Picazo et al. | 709/249 |

* cited by examiner

*Primary Examiner*—Duc C Ho
(74) *Attorney, Agent, or Firm*—Kacvinsky LLC

(57) ABSTRACT

A method and apparatus to perform frame coalescing are described.

21 Claims, 5 Drawing Sheets

METHOD AND APPARATUS TO PERFORM FRAME COALESCING

BACKGROUND

A communication network may comprise a number of network nodes connected by various communication media. The network nodes may communicate information in the form of packets over the communication media in accordance with one or more communication protocols. Each network node may have one or more elements to process the packets in accordance with the protocols. One example of such an element is a Network Interface Card (NIC). A NIC may utilize one or more buffers to store the packets prior to performing packet processing. The NIC may reduce processing cycles for the network node using efficient buffer management techniques. Consequently, there may be need for improvements in buffer management techniques to improve network performance.

BRIEF DESCRIPTION OF THE DRAWINGS

The subject matter regarded as embodiments of the invention is particularly pointed out and distinctly claimed in the concluding portion of the specification. Embodiments of the invention, however, both as to organization and method of operation, together with objects, features, and advantages thereof, may best be understood by reference to the following detailed description when read with the accompanying drawings in which:

DETAILED DESCRIPTION

Figure 1:
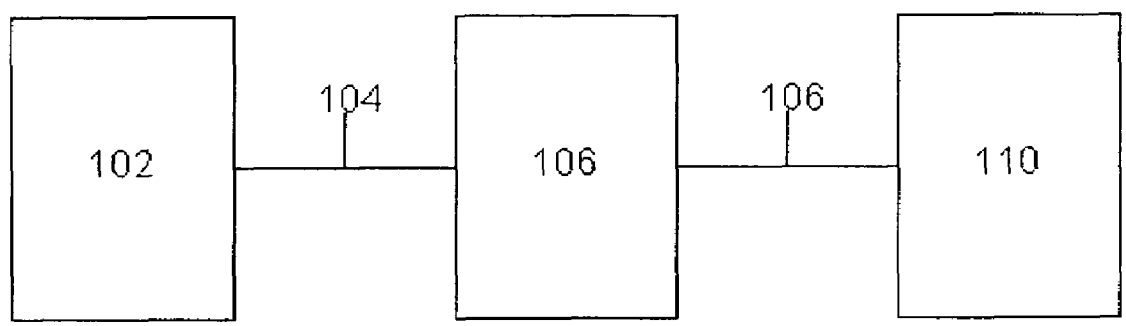
FIG. 1 illustrates a system suitable for practicing one embodiment of the invention.

Embodiments of the invention may comprise a method and apparatus to perform frame coalescing to assist in, for example, buffer management. In one embodiment of the invention, at least one buffer may be initialized. A plurality of packets or frames may be received. The received frames may be coalesced into the buffer. By coalescing multiple frames into a single buffer, a network node may utilize fewer processing cycles to manage the buffer. Consequently, the network node may operate more efficiently leading to better network services.

By way of comparison, a conventional NIC may allocate a single buffer for each frame of received information. This technique permits a device driver and controller for the NIC to communicate information in a uniform manner using a buffer descriptor for each buffer. For example, the device driver may be able to inform the controller of a buffer's properties, such as the memory location, allocated size and so forth. The controller may use the same descriptor to inform the device driver of the presence and properties of the received packet occupying the buffer after use by the controller. The properties may be, for example, frame length, error information, protocol types and so forth. The allocation of a single buffer for every received frame of information may require significant amounts of buffer management, which in turn may consume an unnecessary number of processing cycles.

The embodiments coalesce several received frames into a single large buffer to reduce the number of buffer allocations. A configurable number of frames may be stored in a single large buffer and passed to the protocol stack individually. The embodiments may use a "cloning" function call to assist in this process. Buffer cloning is a mechanism in which the data in a buffer is referenced by one or more buffer descriptors. This mechanism may reduce the amount of data copying that needs to occur in a protocol stack by supporting multiple references to the same data.

Coalescing multiple frames into a single buffer may have several advantages. For example, multiple frames may be DMA transferred in a single Peripheral Component Interconnect (PCI) bus transaction. Transferring several frames at once solves the inefficiency problem of small packets being individually transferred over the PCI bus, thereby making the PCI bus utilization more efficient. Further, buffer memory allocations may be significantly reduced. In addition, the embodiments may reduce processor utilization needed to receive a frame by increasing the number of packets received for the same number of issued receive interrupt requests.

It is worthy to note that any reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

Numerous specific details may be set forth herein to provide a thorough understanding of the embodiments of the invention. It will be understood by those skilled in the art, however, that the embodiments of the invention may be practiced without these specific details. In other instances, well-known methods, procedures, components and circuits have not been described in detail so as not to obscure the embodiments of the invention. It can be appreciated that the specific structural and functional details disclosed herein may be representative and do not necessarily limit the scope of the invention.

Referring now in detail to the drawings wherein like parts are designated by like reference numerals throughout, there is illustrated in FIG. 1 a system suitable for practicing one embodiment of the invention. FIG. 1 is a block diagram of a system 100 comprising a number of network nodes connected by one or more communications media. A network node ("node") in this context may include any device capable of communicating information, such as a computer, server, switch, router, bridge, gateway, personal digital assistant, mobile device and so forth. A communications medium may include any medium capable of carrying information signals, such as twisted-pair wire, co-axial cable, fiber optics, radio frequencies, electronic, acoustic or optical signals, and so forth.

More particularly, system 100 may comprise a source node 102, intermediate node 106 and destination node 110. Source node 102, intermediate node 106 and destination node 110, may be connected by communications media 104 and 108 as shown. Although FIG. 1 shows only one source node, one intermediate node and one destination node, it can be appreciated that any number of network nodes may be used in system 100 and still fall within the scope of the invention. Furthermore, the terms "connection" and "interconnection," and variations thereof, in this context may refer to physical connections and/or logical connections.

In one embodiment of the invention, system 100 may comprise a packet network. A packet network may communicate information in the form of relatively short packets in accordance with one or more communications protocols. A packet may also be referred to herein as a "frame," although the terms may be interchangeable. A frame in this context may refer to a set of information of a limited length, with the length typically represented in terms of bits or bytes. An example of a frame length might be 1514 bytes, which is the length of a frame as defined by one or more Ethernet protocols as defined further below.

A protocol may comprise a set of instructions by which the information signals are communicated over the communications medium. For example, system 100 may operate using one or more communication protocols, such as the Transmission Control Protocol (TCP) as defined by the Internet Engineering Task Force (IETF) standard 7, Request For Comment (RFC) 793, adopted in September, 1981 ("TCP Specification"), and the Internet Protocol (IP) as defined by the IETF standard 5, RFC 791, adopted in September, 1981 ("IP Specification"), both available from "www.ietf.org" (collectively referred to as the "TCP/IP Specification"). In one embodiment of the invention, system 100 may use one or more Ethernet based protocols, such as the Ethernet protocols defined by the Institute of Electrical and Electronics Engineers (IEEE) 802.3 suite of standards, collectively referred to herein as the "Ethernet Specification."

In one embodiment of the invention, source node 102 may comprise a node that originates a set of information for delivery to destination node 110. Destination node 110 may comprise a node that is the intended recipient of the information. Intermediate node 106 may comprise a node that communicates the information between source node 102 and destination node 110. In some cases, there may be more than one source node, destination node, and/or intermediate node. For example, in a multicast connection there may be multiple destination nodes. In another example, there are frequently multiple intermediate nodes between a source node and destination node. One example of each is shown for purposes of clarity, although the embodiments are not limited in this context. Information may comprise any data capable of being represented as a signal, such as an electrical signal, optical signal, acoustical signal and so forth. Examples of information in this context may include data from a voice conversation, videoconference, streaming video, electronic mail ("email") message, voice mail message, alphanumeric symbols, graphics, image, video, text and so forth.

In general operation, source node 102 may send information to destination node 110 through intermediate node 106 in accordance with the Ethernet Specification. The source node breaks a set of information into a series of frames. Each frame may contain a portion of the information plus some control information. The control information may assist intermediate nodes in the network to route each frame to the destination node. Source node 102 may send the frames to intermediate node 106. Intermediate node 106 may receive the frames, store them briefly, and pass them to the next intermediate node or destination node 10. Destination node 110 may eventually receive the entire series of frames and may use them to reproduce the original information sent by source node 102.

Figure 2:
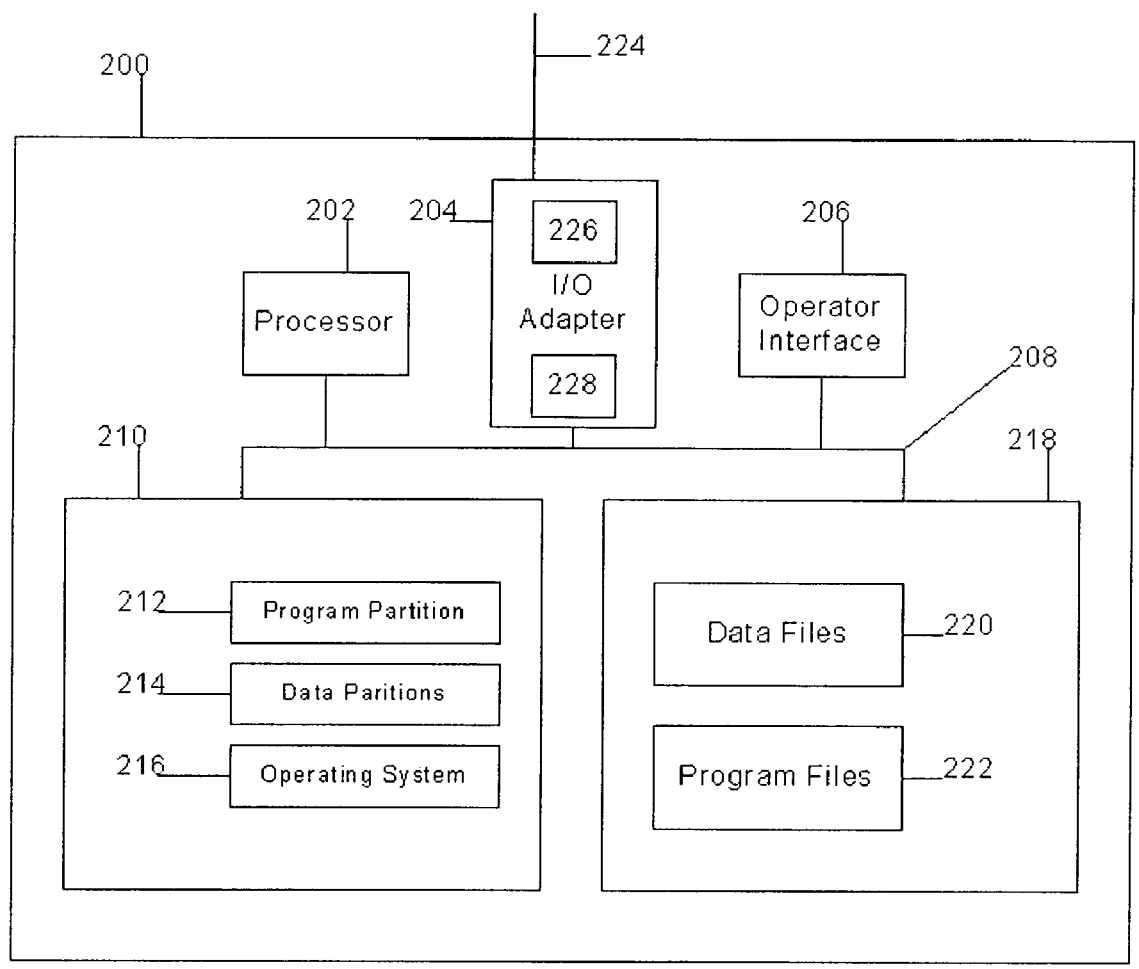
FIG. 2 illustrates a block diagram of a network node in accordance with one embodiment of the invention.

FIG. 2 illustrates a network node in accordance with one embodiment of the invention. In one embodiment of the invention, network node 200 may be representative of any of the devices shown as part of system 100. As shown in FIG. 2, system 200 may include a processor 202, an input/output (I/O) adapter 204, an operator interface 206, a memory 210 and a disk storage 218. Memory 210 may store computer program instructions and data. The term "program instructions" may include computer code segments comprising words, values and symbols from a predefined computer language that, when placed in combination according to a predefined manner or syntax, cause a processor to perform a certain function. Examples of a computer language may include C, C++, JAVA, assembly and so forth. Processor 202 executes the program instructions, and processes the data, stored in memory 210. Disk storage 218 stores data to be transferred to and from memory 210. I/O adapter 204 communicates with other devices and transfers data in and out of the computer system over connection 224. Operator interface 206 may interface with a system operator by accepting commands and providing status information. All these elements are interconnected by bus 208, which allows data to be intercommunicated between the elements. I/O adapter 204 represents one or more I/O adapters or network interfaces that can connect to local or wide area networks such as, for example, the network described in FIG. 1. Therefore, connection 224 represents a network or a direct connection to other equipment.

Processor 202 can be any type of processor capable of providing the speed and functionality required by the embodiments of the invention. For example, processor 202 could be a processor from a family of processors made by Intel Corporation, Motorola Incorporated, Sun Microsystems Incorporated, Compaq Computer Corporation and others. Processor 202 may further comprise a dedicated processor such as a network processor, embedded processor, microcontroller, controller and so forth.

In one embodiment of the invention, memory 210 and disk storage 218 may comprise a machine-readable medium and may include any medium capable of storing instructions adapted to be executed by a processor. Some examples of such media include, but are not limited to, read-only memory (ROM), random-access memory (RAM), programmable ROM, erasable programmable ROM, electronically erasable programmable ROM, dynamic RAM, magnetic disk (e.g., floppy disk and hard drive), optical disk (e.g., CD-ROM) and any other media that may store digital information. In one embodiment of the invention, the instructions are stored on the medium in a compressed and/or encrypted format. As used herein, the phrase "adapted to be executed by a processor" is meant to encompass instructions stored in a compressed and/or encrypted format, as well as instructions that have to be compiled or installed by an installer before being executed by the processor. Further, client 200 may contain various combinations of machine-readable storage devices through various I/O controllers, which are accessible by processor 202 and which are capable of storing a combination of computer program instructions and data.

Memory 210 is accessible by processor 202 over bus 208 and includes an operating system (OS) 216, a program partition 212 and a data partition 214. In one embodiment of the invention, OS 216 may comprise a windows based OS as sold by Microsoft Corporation, such as Microsoft Windows® 95, 98, 2000 and NT, for example, or a Unix based OS such as Linux. Program partition 212 stores and allows execution by processor 202 of program instructions that implement the functions of each respective system described herein. Data partition 214 is accessible by processor 202 and stores data used during the execution of program instructions.

In one embodiment of the invention, program partition 212 may contain program instructions that will be collectively referred to herein as a Buffer Management Module (BMM). This module may perform buffer management for network node 200 for use in, for example, storing of frames of information in one or more buffers. The stored frames may be later retrieved for processing in accordance with one or more protocols. Of course, the scope of the invention is not limited to this particular set of instructions.

I/O adapter 204 may be configured to operate with any suitable means for controlling communication signals between network devices using a desired set of communications protocols, services and operating procedures. Communication protocols are layered, which is also referred to as a protocol stack. I/O adapter 204 may comprise a network adapter or network interface card (NIC) configured to operate with any suitable technique for controlling communication signals between computer or network devices using a desired set of communications protocols, services and operating procedures, for example. In one embodiment of the invention, I/O adapter 204 may operate, for example, in accordance with the Ethernet Specification, although the embodiments are not limited in this context. I/O adapter 204 also includes appropriate connectors for connecting I/O adapter 204 with a suitable communications medium. I/O adapter 204 may receive communication signals over any suitable medium such as copper leads, twisted-pair wire, co-axial cable, fiber optics, radio frequencies, and so forth.

In one embodiment of the invention, I/O adapter 204 may further comprise a Media Access Controller (MAC) 226 and memory 228. Controller 226 may operate in conjunction with a MAC device driver to process frames of information. BMM may be part of the device driver, or work in conjunction with the device driver, as desired for a particular implementation. Further, the BMM and device driver may be stored as part of program partition 212, program files 222, or memory 228, as desired for a particular implementation. It can be appreciated that part or all of the functions of BMM or the device driver may be implemented in hardware as well, and still fall within the scope of the invention.

The operations of systems 100 and 200 may be further described with reference to FIGS. 3-5 and accompanying examples. Although FIG. 3 as presented herein may include a particular programming logic, it can be appreciated that the programming logic merely provides an example of how the general functionality described herein can be implemented. Further, each operation within a given programming logic does not necessarily have to be executed in the order presented unless otherwise indicated.

Figure 3:
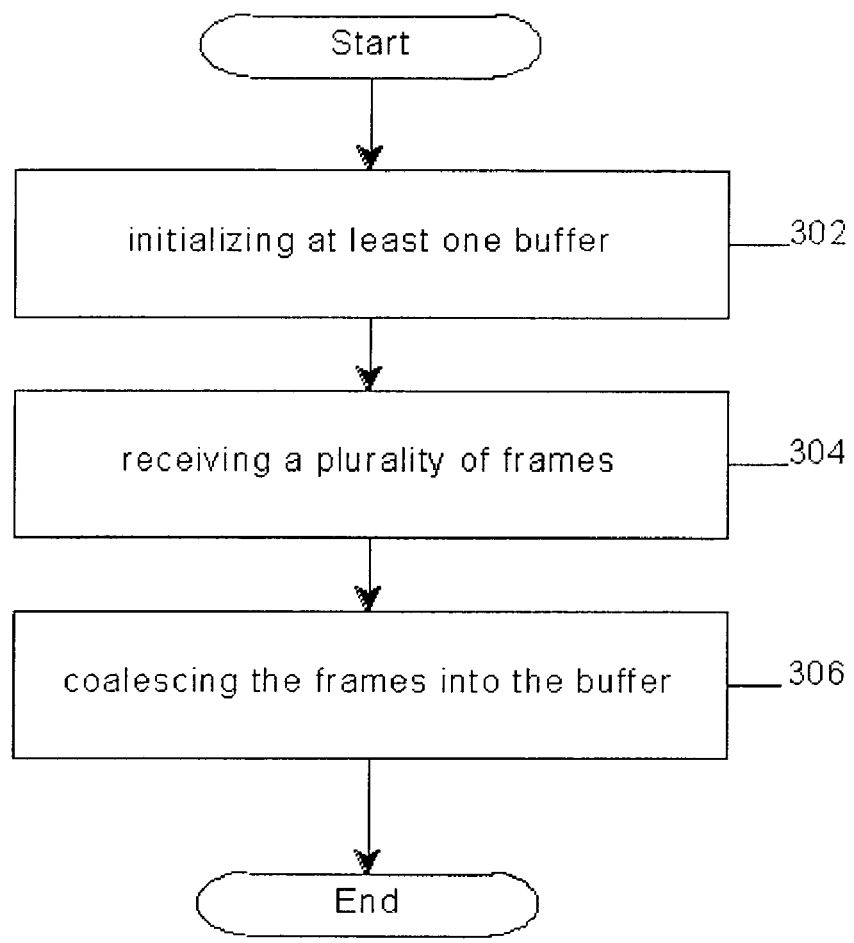
FIG. 3 is a block flow diagram of the programming logic for a BMM in accordance with one embodiment of the invention.

FIG. 3 is a block flow diagram of the operations performed by a BMM in accordance with one embodiment of the invention. In one embodiment of the invention, this and other modules may refer to the software and/or hardware used to implement the functionality for one or more embodiments as described herein. In this embodiment of the invention, these modules may be implemented as part of a NIC, such as I/O adapter 204. It can be appreciated that this functionality, however, may be implemented by any element of a network node and still fall within the scope of the invention.

FIG. 3 illustrates a programming logic 300 for a BMM in accordance with one embodiment of the invention. Programming logic 300 may be implemented to buffer information in the form of frames for a network node. In one embodiment of the invention, at least one buffer may be initialized at block 302. A plurality of frames may be received at block 304. An example of a frame may be an Ethernet frame in accordance with the Ethernet Specification. The plurality of frames may be coalesced into the buffer at block 306.

In one embodiment of the invention, the buffer may be initialized by allocating a receive descriptor ring. Memory may be allocated to the buffer to store a predetermined number of frames. A buffer descriptor may be stored in the receive descriptor ring. The receive descriptor ring including the buffer descriptor may be sent to a controller. The controller may receive the buffer descriptor, and retrieve a location and size for the buffer from it. The controller may use the location and size of the buffer to prepare storing frames in the buffer.

In one embodiment of the invention, the controller may coalesce the frames into the buffer by storing received frames in memory until the predetermined number is reached. The memory may be a First In First Out (FIFO), for example, located on the same chip as the controller. The controller may identify a buffer descriptor for the buffer, and retrieve a buffer address from the buffer descriptor. The controller may begin transferring the frames from said memory to the buffer. The transfer may comprise, for example, a Direct Memory Access (DMA) transfer over a PCI bus. Moreover, the transfer may be accomplished in a single bus transaction since the frames are stored in the same buffer.

Once the frames are stored in the buffer, the controller may identify a buffer descriptor as valid. The term "valid" may indicate that the controller is currently using the buffer. The notification may take the form of, for example, sending a receive interrupt indicating the buffer descriptor is valid. The controller may notify the device driver of the valid buffer descriptor. Each frame may be retrieved from the buffer using information from the valid buffer descriptor. The retrieved frames may be processed in accordance with at least one protocol from the protocol stack.

In one embodiment of the invention, the valid buffer descriptor may comprise information about the buffer. The information may include, for example, a head identifier, a data identifier, a tail identifier and an end identifier. Each identifier may be a memory address, or pointer to a memory address, although the embodiments are not limited in this context. This information may be used to retrieve each frame from the buffer.

In one embodiment of the invention, each frame except the last may be retrieved from the buffer using, for example, a "cloning" function call from the Operating System (OS), as discussed in more detail later. A request to begin processing a frame may be received. A copy of the valid buffer descriptor may be made using the cloning function call. The data identifier and tail identifier of the copy may be modified to reflect a start address and end address for the requested frame. The requested frame may be retrieved from the buffer using the modified data identifier and tail identifier from the copy of the buffer descriptor.

For the last frame stored in the buffer, a cloned buffer descriptor may not be necessary. A request to begin processing a frame may be received. A determination that the requested frame is the last frame in the buffer may be made. The last frame may be retrieved from the buffer using the data identifier and tail identifier of the original buffer descriptor.

The operation of systems 100 and 200, and the programming logic shown in FIG. 3, may be better understood by way of example. Assume system 100 comprises a network node 200 configured to communicate frames of information in accordance with the Ethernet Specification. Further assume OS 216 is a version of Linux. Any type of Linux may be assumed, as long as it includes functionality capable of cloning a buffer descriptor.

In general operation, MAC 226 may get a descriptor list from the device driver using any number of techniques. The descriptors describe memory in the network node where incoming Ethernet frames will be placed. The memory may be, for example, memory 228 or data partition 214. The descriptors typically describe enough memory to hold an entire Ethernet frame, which may comprise 1518 bytes if Cyclic Redundancy Check (CRC) bytes are included. When the device driver for node 200 needs to allocate a buffer, it may use system calls to perform this task. For example, with a Linux OS the call may be "skb_alloc." In UNIX, the call may be "allocb." The skb_alloc call will return a pointer to a socket buffer, which in Linux is sometimes referred to as a "SKB." The pointer to the data section described by this SKB may be in the descriptor. The pointer may be passed to MAC 226 to DMA a received frame into the buffer.

Figure 4:
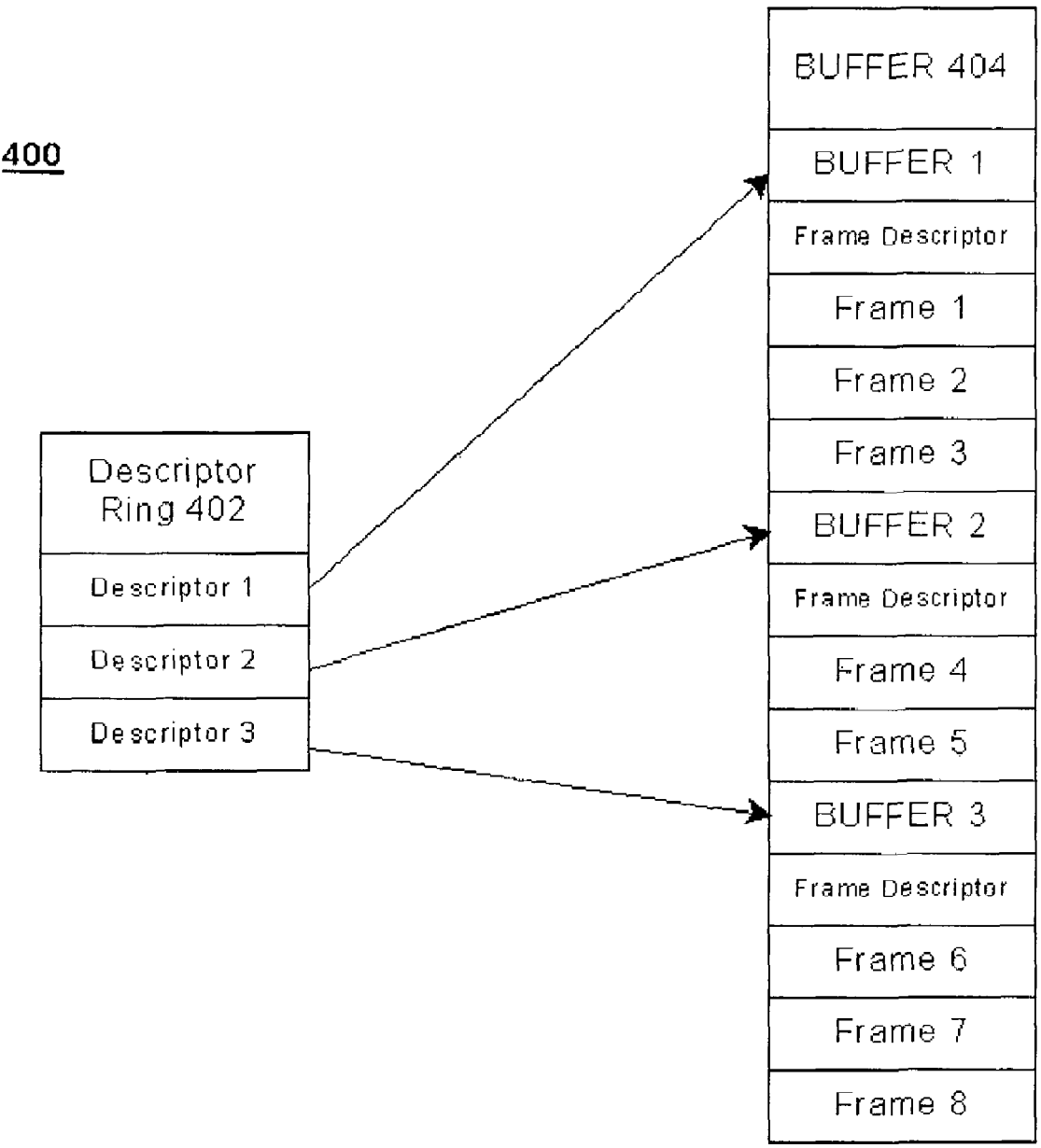
FIG. 4 is an illustration of frame coalescing for a plurality of buffers in accordance with one embodiment of the invention.

FIG. 4 is an illustration of frame coalescing for a plurality of buffers in accordance with one embodiment of the invention. FIG. 4 illustrates a buffer diagram 400, comprising a descriptor ring 402 and a buffer 404. Descriptor ring 402 may comprise, for example, a descriptor 1, a descriptor 2 and a descriptor 3. Buffer 404 may comprise, for example, a buffer 1, buffer 2 and buffer 3. Buffer 1 may further comprise a frame descriptor, and may store frames 1, 2 and 3. Buffer 2 may further comprise a frame descriptor, and may store frames 4 and 5. Buffer 3 may further comprise a buffer descriptor, and may store frames 6, 7 and 8. As shown in diagram 400, the total memory allocations for MAC 226 may be separated into a plurality of buffers, with each buffer configurable to hold a predetermined number of Ethernet frames. This may be more efficient than, for example, allocating a single buffer for every frame as in conventional systems.

As mentioned previously, one of the advantages of the embodiments may be the reduction of receive buffer allocations from system memory, such as memory 210 or 218. Buffer allocation may be a relatively expensive operation within the system in terms of processing cycles. Moreover, the time required to complete a buffer allocation may increase as the system memory becomes increasingly fragmented over time. The embodiments may reduce these buffer allocations because the same buffer is used to hold multiple Ethernet frames. The buffer is allocated with a size, which is configurable to the number of Ethernet frames it will contain. For example, an equation for the buffer size may be as follows:

buffer_size=<max Ethernet frame size>*<configurable number of frames>

This equation will give the minimum of a buffer that could contain the configured number of full sized Ethernet frames. As an example, if the number of configurable frames were set to 4, the buffer size would be:

6072=1518*4

Accordingly, this buffer could hold 4 full-sized Ethernet frames including the CRC values if the Ethernet controller is configured to do so. As demonstrated, this may significantly reduce the buffer allocations by a <configured number of frame> to 1, or in the example above 4:1. In this example, the allocations may be reduced by 75%.

Figure 5:
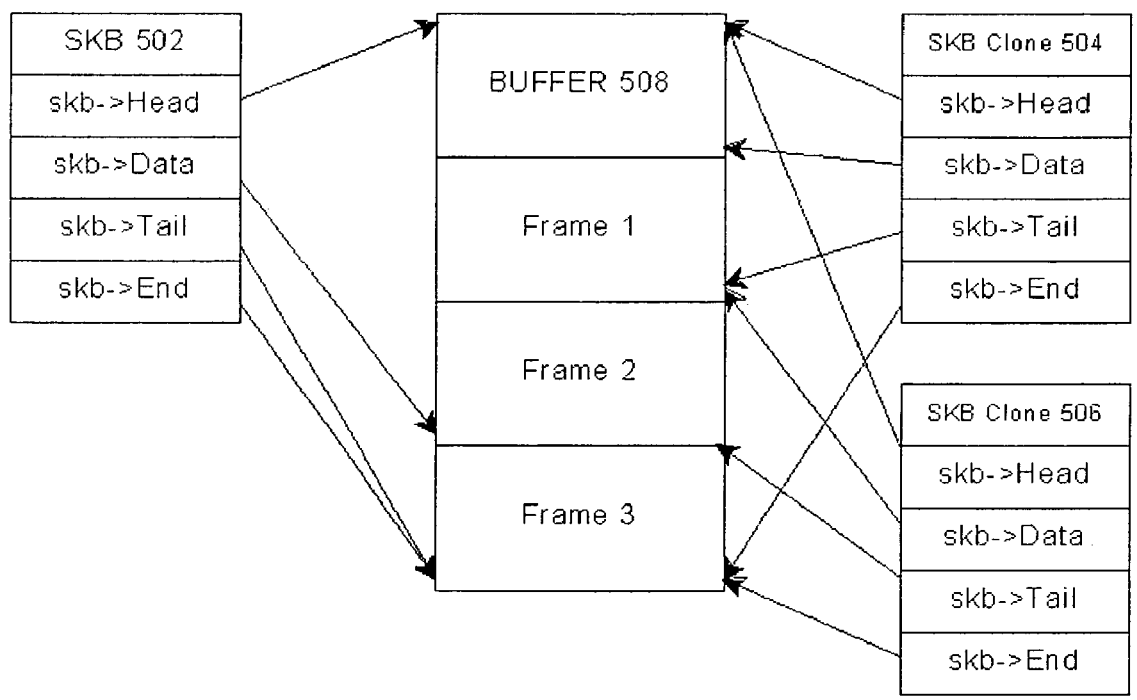
FIG. 5 is an illustration of frame coalescing for a single buffer in accordance with one embodiment of the invention.

FIG. 5 is an illustration of frame coalescing for a single buffer in accordance with one embodiment of the invention. FIG. 5 illustrates a buffer diagram 500. Buffer diagram 500 may illustrate a SKB 502, a first SKB Clone 504 and a second SKB Clone 506. Buffer diagram 500 may also illustrate a buffer 508, holding Frames 1, 2 and 3. Each SKB and SKB Clone may have a set of information describing buffer 508. For example, SKB 502 and SKB Clones 504 and 506 each include a Head identifier, a Data identifier, a Tail identifier and an End identifier. Each identifier may be a memory address, or pointer to a memory address, although the embodiments are not limited in this context. This information may be used to retrieve each frame from the buffer.

As shown in FIG. 5, the data and tail pointers for each SKB and cloned SKB may point to their respective frames, which they each represent within buffer 508. The head and end pointers for each SKB and cloned SKB may point to the entire data block that was allocated for buffer 508 SKB. It may be appreciated that the data and tail pointers may only point at the actual frame within buffer 508.

The embodiments of the invention may use the cloning function call from the Linux or Unix OS to clone the stack data buffer structure or SKB. The Linux OS has the ability to clone these SKBs with the skb_clone function call. The skb_clone call does not copy the data but uses another buffer descriptor that points to the same data buffer portion of the SKB. A reference count within the SKB is incremented so that all references to the SKB, cloned and original, know that the SKB has been cloned and how many times that it has been cloned. This information is needed when the OS releases the SKB. If the reference count is not one (1) then the reference count is decremented and the descriptor portion of the cloned SKB is returned to the free list. Once the reference count goes to zero (0) the data portion of the SKB is finally freed back to the system for re-allocation.

When the coalescing mechanism is being used, multiple frames may be put into an SK that is large enough to hold multiple full size Ethernet frames. When the first frame is being indicated up the stack, SKB 502 may be cloned using the skb_clone call, resulting in SKB Clone 504, for example. The data and tail pointers in SKB Clone 504 may be manipulated to point to the first frame of data in buffer 508, as indicated by the arrows. On indicating the second frame, the process may be repeated except that the data and tail pointers in SKB Clone 506 may be manipulated to point to the second frame of data in buffer 508, as indicated by the arrows. This may continue until the last frame is indicated, as represented in diagram 500 as Frame 3. During the processing of the last frame, SKB 502 may not be cloned since the data and tail pointers already point to the last frame in buffer 508. Once the last frame is processed, the entire SKB may be released back to the OS.

In operation, node 200 may begin by initializing the buffers for use by MAC 226. The device driver allocates a receive descriptor ring, such as descriptor ring 402. The device driver fills descriptor ring 402 with buffers that are large enough to hold a configurable number of full sized Ethernet frames, e.g., Buffers 1, 2 and 3. The device driver informs MAC 226 of the frame descriptor ring location and size. MAC 226 reads valid descriptors (e.g., Descriptors 1, 2 and 3) from descriptor ring 402, to learn the location and size information of the buffers in memory that it may use for received Ethernet frames.

Upon receiving an Ethernet frame from the network, MAC 226 places it into its on-chip FIFO memory, such as memory 228. MAC 226 continues to receive incoming Ethernet frames into memory 228 until enough frames are in the FIFO to fill the configured number of frames in the receive buffer. MAC 226 then determines which buffer descriptor to use and loads the address of the buffer to DMA. MAC 226 then uses a DMA transfer to move the received frames into the buffer, such as buffer 508. Buffer 508 may be pre-fixed with the frame descriptor information about all of the frames so that the offset of each frame can be presented to the device driver. MAC 226 then informs the device driver of the now valid descriptor via the configured mechanism, usually a receive interrupt. The device driver reads the descriptor information from buffer 508 and process each frame out of the large buffer passing each frame up the protocol stack as each frame is parsed out of the large buffer, using SKB 502, SKB Clone 504 and SKB Clone 506.

While certain features of the embodiments of the invention have been illustrated as described herein, many modifications, substitutions, changes and equivalents will now occur to those skilled in the art. It is, therefore, to be understood that the appended claims are intended to cover all such modifications and changes as fall within the true spirit of the embodiments of the invention.

The invention claimed is:

1. A method to buffer information, comprising:
   initializing at least one buffer by allocating said at least one buffer to store a predetermined number of frames and frame descriptor information about said plurality of frames;
   receiving a plurality of frames from said predetermined number of frames;
   coalescing said plurality of frames into said at least one buffer; and
   wherein said initializing comprises:
      allocating a receive descriptor ring;
      storing a buffer descriptor of the at least one buffer in said receive descriptor ring; and
      informing a controller of said receive descriptor ring.

2. The method of claim 1, wherein each frame is an Ethernet frame.

3. The method of claim 1, further comprising:
   reading said buffer descriptor of the at least one buffer from said receive descriptor ring by said controller;
   retrieving a location and size for said at least one buffer from said buffer descriptor; and
   preparing to store frames using said location and size of said at least one buffer.

4. A method, comprising:
   initializing at least one buffer by allocating said at least one buffer to store a predetermined number of frames;
   receiving a plurality of frames from said predetermined number of frames;
   coalescing said plurality of frames into said at least one buffer; and
   wherein said initializing comprises:
      allocating a receive descriptor ring;
      storing a buffer descriptor of the at least one buffer in said receive descriptor ring; and
      informing a controller of said receive descriptor ring;
   wherein said coalescing comprises:
      storing said frames in memory until said predetermined number is reached;
      identifying a buffer descriptor for said at least one buffer;
      retrieving a buffer address from said buffer descriptor; and
      transferring said frames from said memory to said at least one buffer.

5. The method of claim 4, wherein said transferring comprises a Direct Memory Access (DMA) transfer over a Peripheral Component Interface (PCI) bus in a single bus transaction.

6. The method of claim 4, further comprising:
   identifying said buffer descriptor as valid;
   notifying a device driver of said valid buffer descriptor;
   retrieving each frame from said at least one buffer using said valid buffer descriptor; and
   processing each retrieved frame in accordance with at least one protocol.

7. The method of claim 6, wherein said notifying comprises sending a receive interrupt indicating said buffer descriptor is valid.

8. The method of claim 6, wherein said valid buffer descriptor comprises a data identifier and a tail identifier, and said retrieving each frame comprises:
   receiving a request to begin processing a frame;
   creating a copy of said valid buffer descriptor;
   modifying said data identifier and tail identifier of said copy to reflect a start address and end address for said requested frame; and
   retrieving said requested frame from said at least one buffer using said modified data identifier and tail identifier.

9. The method of claim 8, wherein said creating said copy is performed using a clone buffer descriptor function call.

10. The method of claim 6, wherein said valid buffer descriptor comprises a data identifier and a tail identifier, and said retrieving each frame comprises:
    receiving a request to begin processing a frame;
    determining that said requested frame is a last frame in said at least one buffer; and
    retrieving said last frame from said at least one buffer using said data identifier and said tail identifier.

11. A computer-readable non-volatile or volatile storage medium encoded with instructions capable of being executed by a computer, when executed by a computer, result in buffering information by initializing at least one buffer by allocating said at least one buffer to store a predetermined number of frames and frame descriptor information about said plurality of frames, receiving a plurality of frames from said predetermined number of frames, and coalescing said plurality of frames into said at least one buffer, wherein said initializing comprises allocating a receive descriptor ring, storing a buffer descriptor of said at least one buffer in said receive descriptor ring, and informing a controller of said receive descriptor ring.

12. The storage medium of claim 11, wherein encoded instructions, when executed by said computer, further result in reading said buffer descriptor of the at least one buffer from said receive descriptor ring by said controller, retrieving a location and size for said at least one buffer from said buffer descriptor, and preparing to store frames using said location and size of said at least one buffer.

13. A computer-readable non-volatile or volatile storage medium encoded with instructions capable of being executed by a computer, when executed by a computer, result in buffering information by initializing at least one buffer by allocating said at least one buffer to store a predetermined number of frames, receiving a plurality of frames from said predetermined number of frames, and coalescing said plurality of frames into said at least one buffer, wherein said initializing comprises allocating a receive descriptor ring, storing a buffer descriptor of said at least one buffer in said receive descriptor ring, and informing a controller of said receive descriptor ring, and further result in said coalescing by storing said frames in memory until said predetermined number is reached, identifying a buffer descriptor for said at least one buffer, retrieving a buffer address from said buffer descriptor, and transferring said frames from said memory to said at least one buffer.

14. The storage medium of claim 13, wherein encoded instructions, when executed by said computer, further result in said transferring by performing a Direct Memory Access (DMA) transfer over a Peripheral Component Interface (PCI) bus in a single bus transaction.

15. The storage medium of claim 13, wherein encoded instructions, when executed by said computer, further result in identifying said buffer descriptor as valid, notifying a device driver of said valid buffer descriptor, retrieving each frame from said at least one buffer using said valid buffer descriptor, and processing each retrieved frame in accordance with at least one protocol.

16. The storage medium of claim 15, wherein encoded instructions, when executed by said computer, further result in said notifying by sending a receive interrupt indicating said buffer descriptor is valid.

17. The storage medium of claim 15, wherein encoded instructions, when executed by said computer, further result in said valid buffer descriptor comprising a data identifier and a tail identifier, and said retrieving each frame comprises receiving a request to begin processing a frame, creating a copy of said valid buffer descriptor, modifying said data identifier and tail identifier of said copy to reflect a start address and end address for said requested frame, and retrieving said requested frame from said at least one buffer using said modified data identifier and tail identifier.

18. The storage medium of claim 17, wherein encoded instructions, when executed by said computer, further result in said valid buffer descriptor comprising a data identifier and a tail identifier, and said retrieving each frame comprises receiving a request to begin processing a frame, determining that said requested frame is a last frame in said at least one buffer, and retrieving said last frame from said at least one buffer using said data identifier and said tail identifier.

19. The storage medium of claim 18, wherein encoded instructions, when executed by said computer, further result in said creating said copy by using a clone buffer descriptor function call.

20. A system to buffer information, comprising:
a source node to send a plurality of Ethernet frames;
a network connected to said source node to communicate said Ethernet frames;
a destination node connected to said network to receive and process said plurality of Ethernet frames by coalescing a predetermined number of said frames into at least one buffer, wherein said destination node comprises:
a media access controller (MAC);
a Buffer Management Module (BMM) in communication with said MAC to initialize said at least one buffer for use by said MAC, said BMM assisting said MAC in storing said frames in said at least one buffer, and retrieving said frames from said at least one buffer for processing by at least one communications protocol; and
wherein said BMM further comprises a cloning module to create at least one clone of a buffer descriptor for said buffer for use in storing said frames in said buffer and retrieving said frames from said buffer.

21. An apparatus, comprising:
a media access controller (MAC);
a Buffer Management Module (BMM) in communication with said MAC to initialize at least one buffer for use by said MAC, the initializing comprising allocating the at least one buffer to store a predetermined number of frames, said BMM assisting said MAC in storing frames in said at least one buffer, and retrieving said frames from said at least one buffer for processing by at least one communications protocol; and
wherein said BMM further comprises a cloning module to create at least one clone of a buffer descriptor for said at least one buffer for use in storing said frames in said at least one buffer and retrieving said frames from said at least one buffer.

\* \* \* \* \*

UNITED STATES PATENT AND TRADEMARK OFFICE
CERTIFICATE OF CORRECTION

PATENT NO.         : 7,643,502 B2                                    Page 1 of 1
APPLICATION NO.    : 10/326238
DATED              : January 5, 2010
INVENTOR(S)        : John A. Ronciak It is certified that error appears in the above-identified patent and that said Letters Patent is hereby corrected as shown below:

In Sheet 1 of 5, Figure 1, line 1, before "110" delete "106" and insert -- 108 --, therefor.

In column 11, line 18, in Claim 18, delete "claim 17," and insert -- claim 15, --, therefor.

Signed and Sealed this

Twenty-third Day of March, 2010

David J. Kappos
*Director of the United States Patent and Trademark Office*

UNITED STATES PATENT AND TRADEMARK OFFICE
CERTIFICATE OF CORRECTION

PATENT NO. : 7,643,502 B2 Page 1 of 1
APPLICATION NO. : 10/326238
DATED : January 5, 2010
INVENTOR(S) : John A. Ronciak It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 2120 days.

Signed and Sealed this

Sixteenth Day of November, 2010

David J. Kappos
*Director of the United States Patent and Trademark Office*